US008321252B2

(12) United States Patent
Gliozzi et al.

(10) Patent No.: US 8,321,252 B2
(45) Date of Patent: *Nov. 27, 2012

(54) AIR CARGO YIELD MANAGEMENT SYSTEM FOR UTILIZING BOOKING PROFILES AND UNCONSTRAINED DEMAND

(75) Inventors: Stefano Gliozzi, Genzano di Roma (IT); Alberto Maria Marchetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,150

(22) Filed: Jan. 31, 2012

(65) Prior Publication Data

US 2012/0143647 A1    Jun. 7, 2012

Related U.S. Application Data

(63) Continuation of application No. 12/171,895, filed on Jul. 11, 2008, now Pat. No. 8,117,055, which is a continuation of application No. 10/042,624, filed on Jan. 9, 2002, now Pat. No. 7,430,518.

(30) Foreign Application Priority Data

Jul. 12, 2001  (GB) .................................. 0116987.9

(51) Int. Cl.
G06Q 10/00    (2012.01)
(52) U.S. Cl. .................................................... 705/7.12
(58) Field of Classification Search .................. 705/7.12
See application file for complete search history.

(56) References Cited

U.S. PATENT DOCUMENTS 5,255,184 A    10/1993  Hornick et al.
5,404,291 A    4/1995   Kerr et al.
6,263,315 B1   7/2001   Talluri
(Continued)

FOREIGN PATENT DOCUMENTS

WO    97/25684    7/1997

OTHER PUBLICATIONS

Zeni, Richard Henry, Improved Forecast Accuracy in revenue management by unconstraining demand estimates from censored data, Rutgers State University, Oct. 2001.*

(Continued)

Primary Examiner — Scott L Jarrett
(74) Attorney, Agent, or Firm — Ronald A. Kaschak; Kevin P. Radigan, Esq.; Heslin Rothenberg Farley & Mesiti P.C.

(57) ABSTRACT

A yield management method and system are provided for enhancing revenue obtained from a given cargo flight capacity; the capacity being defined by the weight and volume of freights that may be transported. A set of historical profiles of capacity reserved by each category is stored for previous instances of the flight. Corresponding potential profiles are estimated independently for the weight and volume. The estimation is carried out taking into consideration the corresponding capacity currently reserved by the category for a future instance of the flight; and this result is emphasized according to a corresponding unconstrained demand for the category. A series of historical scenarios of the demand at the departure of previous instances of the flight are obtained from the potential profiles, and a stochastic model is applied to the historical scenarios according to the corresponding probabilities for calculating the optimised weight and volume authorizations for each category.

18 Claims, 8 Drawing Sheets

U.S. PATENT DOCUMENTS

| | | | |
|---|---|---|---|
| 6,418,413 | B2 | 7/2002 | DeMarcken et al. |
| 6,526,392 | B1 | 2/2003 | Dietrich et al. |
| 6,804,658 | B2 | 10/2004 | Lim et al. |
| 6,937,992 | B1 | 8/2005 | Benda et al. |
| 7,110,960 | B2 | 9/2006 | Phillips et al. |
| 7,194,418 | B2 | 3/2007 | Smith |
| 7,430,518 | B2 * | 9/2008 | Gliozzi et al. ............ 705/5 |
| 8,117,055 | B2 * | 2/2012 | Gliozzi et al. ............ 705/7.12 |
| 2002/0065699 | A1 | 5/2002 | Talluri |
| 2008/0300941 | A1 | 12/2008 | Gliozzi et al. |

OTHER PUBLICATIONS

Lee, Anthony Owen, Airline reservations forecasting: Probabalistic and statistical models of the booking process Massachusetts Institute of Technology, 1990.*

Gunher, Dirk, Airline Yield Management: Optimal Bid Prices, Markov Decision Processes and Routing Considerations Georgia Institute of Technology, Aug. 19, 1998.*

Ott, James, Swissair Test Cargo Management System to Stem Declining Yield Aviation Week & Space Technology, vol. 129, No. 4, Jul. 25, 1998.*

Bazaraa, Mokhtar, Airline capacity forecasts help shippers plan more accurately Air Cargo World, vol. 82, No. 4, Apr. 1992.*

Adyanthaya, Surian, Revenue Management: The Black Art Interavia Business & Technology, vol. 53, No. 623, Sep. 1998.*

Sabre AirMax v5.0 Revenue Management System North American News, May 9, 2001.*

Nelms, Douglas W., American's freight bonanza Air Transport World, vol. 28, No. 5, May 1991.*

Hawaiian Airlines to implement AirMax Yield Management System Business Wire, Feb. 3, 1997.*

AirTran Airways Selects PROS Revenue Management Systems—New System to Optimize Seat Allocation and Forecasting Business Wire, May 4, 2000.*

McGill, Jeffrey I. et al., Revenue Management: Research Overview and Prospects Transportation Science, vol. 33, No. 2, May 1999.*

Cargo Study Group Meeting 1999—Cargo: Revenue of the Millennium AGIFORS Operations Control Study Group, Mar. 1999.*

DFI-Aeronomics Announces Breakthrough Revenue Management Solution for Air Cargo Business Wire, May 1, 1998.*

Glozzi, Stefano et al., A New Yield Management Approach for Continuous Multi-variable Books: The Airline Cargo Case Operations Research in Space and Air, Kulwer Academic Publishers, Chapter 19, 2003.*

Adyanthaya, Surain, "Revenue Management: The Black Art Interavia Business & Technology", vol. 53, No. 623, Sep. 1998.

Boyd, Andrew, "An Abstraction of Revenue Management for the Air Cargo Industry", 2001.

Brumelle, S.L. et al., "Airline Seat Allocation With Multiple Nested Fare Classes Operations Research", vol. 41, No. 1, Jan./Feb. 1993, pp. 127-137.

Ciriani, Tito A., "IBM Stochastic Solution", AIROnews, vol. 1, No. 1, Spring 2001, pp. 6-10.

Gunther, Dirk, "Airline Yield Management: Optimal Bid Prices, Markov Decision Processes and Routing Considerations", Georgia Institute of Technology, Thesis, Aug. 19, 1998.

Karaesmen, Itir Zeynep, "Three Essays on Revenue Management", Columbia University, AAT3028540, 2001.

Kasilingam, R.G., "Air Cargo Revenue Management: Characteristics and Complexities", European Journal of Operational Research, 1996.

Kasilingam, R.G., "An Economic Model for Air Cargo overbooking Under Stochastic Capacity" Computers Ind. Engng, vol. 32, No. 1, 1997, pp. 221-226.

King, Alan, "Stochastic Programming in the New Century", AIROnews, vol. 1, No. 1, Spring 2001, pp. 1-5.

Lee, Anthony Owen, "Airline Reservations Forecasting: Probabilistic and Statistical Models", Massachusetts Institute of Technology, Dissertation, AAT 0570280, 1990.

McGill, Jeffrey I et al., "Revenue Management: Research Overview and Prospects Transportation Science", vol. 33, No. 2, May 1999, pp. 233-256.

Meril, Anita et al., "Slot Allocation Models for Scheduling Applications", AIROnews, vol. 1, No. 1, Spring 2001, pp. 11-12.

Mokhtar, Bazaraa, "Airline Capacity Forecasts Help Shippers Plan More Accurately", Air Cargo World, vol. 82, No. 4, Apr. 1992.

Ott, James, "Swissair Tests Cargo Management System to Stem Declining Yield Aviation Week", vol. 129, No. 4, Jul. 25, 1988.

Sobie, Brendan, "Freight's Yield Signs", Air Cargo World, vol. 90, No. 7, Jul. 2000.

Van Ryzin, Garrett et al., "Revenue Management Without Forecasting or Optimization: An Adaptive Algorithm for Determining Airline Set Protection Levels", Management Science, vol. 46, No. 6, Jun. 2000, pp. 760-775.

Wickham, Richard Robert, "Evaluation of Forecasting Techniques for Short-Term Demand of Air Transportation", Massachusetts Institute of Technology, Abstract, Jun. 1995.

Williams, Loren, "Revenue Management: Microeconomics and Business Modeling Business Economics", vol. 34, No. 2, Apr. 1999, pp. 39-45.

Williamson, Elizabeth Louise, Ph.D., "Airline Network Seat Inventory Control: Methodologies and Revenue Impacts", Massachusetts Institute of Technology, Abstract, 1992.

Zaki, Hosman, "Forecasting for Airline Revenue Management", Journal of Business Forecasting Methods & Systems, vol. 19, No. 1, Spring 2000.

Zeni, Richard Henry, "Improved Forecast Accuracy in Revenue Management by Unconstraining Demand Estimates from Censored Data", Rutgers University, AAT3043644, 2001.

Popovic, Jovan et al., "An adaptive Method for Generating Demand Inputs to Airline Seat Inventory Control Models", Transportation Research, vol. 31, No. 2 (1997).

Bodily, SE et al., "Perrishable-Asset Revenue Management" Generic and Multi-Price Yield Management with Diversion, Omega International Journal of Management, vol. 32, No. 2 (1995).

Smith, Barry et al. "E-commerce and Operations Research in Airline Planning, Marketing, and Distribution", Interfaces, Linthicum: Mar./Apr. 2001, vol. 31, No. 2.

"Yields Making Cargo Pay," Airline Business, vol. 2, No. 1, Jan. 1, 1998, pp. 1-3.

Gliozzi et al., Office Action for U.S. Appl. No. 10/042,624, filed Jan. 9, 2002 (U.S. Letters Patent No. 7,430,518 B2), dated May 7, 2007.

Gliozzi et al., Final Office Action for U.S. Appl. No. 10/042,624, filed Jan. 9, 2002 (U.S. Letters Patent No. 7,430,518 B2), dated Oct. 31, 2007.

Gliozzi et al., Examiner's Amendment for U.S. Appl. No. 10/042,624, filed Jan. 9, 2002 (U.S. Letters Patent No. 7,430,518 B2), dated Aug. 11, 2008.

Gliozzi et al., Notice of Allowance for U.S. Appl. No. 12/171,895, filed Jul. 11, 208 (U.S. Patent Publication No. 2008/0300941 A1), dated Jul. 18, 2011.

Gliozzi et al., Notice of Allowance for U.S. Appl. No. 12/171,895, filed Jul. 11, 208 (U.S. Patent Publication No. 2008/0300941 A1), dated Oct. 5, 2011.

Gliozzi et al., Supplemental Notice of Allowance for U.S. Appl. No. 12/171,895, filed Jul. 11, 208 (U.S. Patent Publication No. 2008/0300941 A1), dated Jan. 10, 2012.

* cited by examiner

AIR CARGO YIELD MANAGEMENT SYSTEM FOR UTILIZING BOOKING PROFILES AND UNCONSTRAINED DEMAND

CROSS-REFERENCE TO RELATED APPLICATIONS

This application is a continuation of U.S. Ser. No. 12/171,895, filed Jul. 11, 2008, entitled "Air Cargo Yield Management System for Utilizing Booking Profiles and Unconstrained Demand", by Gliozzi et al., which published Dec. 4, 2008, as U.S. Patent Publication No. 2008/0300941 A1, and which itself is a continuation of U.S. Pat. No. 7,430,518 B2, issued Sep. 30, 2008, entitled "Air Cargo Yield Management System for Utilizing Booking Profiles and Unconstrained Demand", by Gliozzi et al., the entirety of each of which is hereby incorporated herein by reference. This application also claims priority to United Kingdom Application No. 0116987.9, filed Jul. 12, 2001.

TECHNICAL FIELD

The present invention relates to a yield management method and system.

BACKGROUND OF THE INVENTION

Yield Management Systems (YMSs) are commonly used as computer-based supports to facilitate decisions in several applications, such as in the transportation business and, in particular, in the airline industry. The goal of a yield management system is that of allocating an offered capacity to different types of requests (categories), in order to optimise a yield parameter. For example, the yield management system is used to maximise the revenue that can be obtained from selling a given transportable weight and volume of a cargo flight; the objective is to fly an aircraft as profitable as possible without allowing low-fare freights to displace high-fare freights.

All yield management systems use a forecast method to estimate the requests of the different categories; a decisional system is then applied to the estimated requests for determining a suggestion that should be given to maximise the yield parameter. Typically, stochastic or probabilistic methods are employed, in order to take into account an uncertainty of the estimated requests (and not only their mean value).

A solution known in the art consists of estimating a simple probabilistic distribution of the variables involved in the yield management system. A stochastic linear programming model is then applied using the simple probabilistic distribution to determine an allocation model that maximizes a target function defining the yield parameter. An example of the aforementioned method is described in Williamson, E. L. "Airline Network Seat Inventory Control: Methodologies and Revenue Impact", Massachusetts Institute of Technology Phd Thesis—Cambridge (Mass) June 1992.

A drawback of the solutions known in the art is that they become computationally intractable when a complexity of the problem defined by the yield management system increases. This is particular critical if the offered capacity is defined by more than one variable, such as the weight and the volume of a cargo flight. In these cases many simplifications, shortcuts and assumptions are introduced, in order to solve the problem in a reasonable amount of time. For example, the number of categories is limited or a manageable form of the probabilistic distributions is assumed (for example a Gauss, Poisson or uniform distribution). Moreover, the known solutions discard some capacity variables (for example using only the weight and just checking a posteriori if volume constraints are satisfied) or discard the stochastic nature of the yield parameter (for example considering only its mean value).

However, all the simplifications described above strongly reduce the accuracy of the yield management system. As a consequence, the solutions known in the art may lead to a relevant economic lost.

It is an object of the present invention to overcome the above-mentioned drawbacks. In order to achieve this object, a method as set out in the first claim is proposed.

SUMMARY OF THE INVENTION

Briefly, the present invention provides a yield management method for optimising a yield parameter resulting from assigning a capacity offered by a future instance of a service to each one of a plurality of different categories of requests competing for the capacity, the capacity being defined by at least one capacity variable, the method including the steps of: storing a set of historical profiles for each one of a plurality of previous instances of the service, the set including a historical profile of an historical value of each capacity variable reserved by each category, assigning a probability to each previous instance of the service, estimating a potential profile of a potential value of the capacity variable from each historical profile according to a corresponding current value of the capacity variable reserved by the category for the future instance of the service and according to a corresponding unconstrained demand of the capacity variable for the category in the previous instance of the service, defining a historical scenario for each previous instance of the service, the historical scenario including a final potential capacity variable from each corresponding potential profile, and determining an authorisation to allocate the offered capacity for each capacity variable of each category in the future instance of the service by applying a stochastic model to the historical scenarios according to the corresponding probabilities.

Moreover, the present invention also provides a computer program application for performing the method, a program product storing the program application, and a corresponding yield management system.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DETAILED DESCRIPTION

Figure 1:
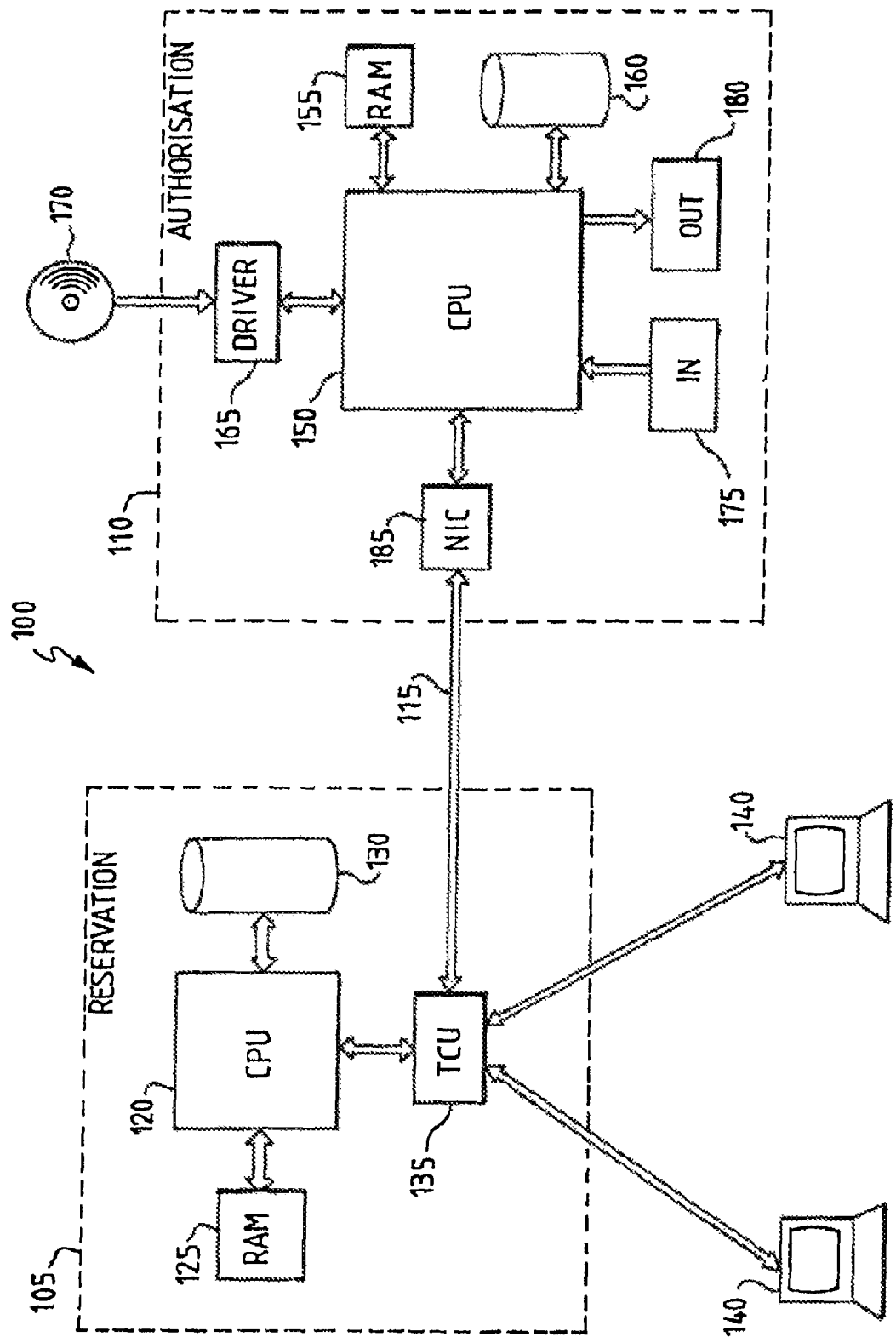
FIG. 1 is basic block diagram of a data processing system in which the yield management method of the invention can be used.

With reference in particular to FIG. 1, there is shown a data processing system 100, which is used as a computerised support for controlling cargo flights of an airline. The system 100 is formed by a reservation subsystem 105 and an authorisation subsystem 110; the subsystems 105 and 110 are connected to each other through a communication channel 115.

The reservation subsystem 105 consists of a mainframe having a Central Processing Unit (CPU) 120. A working memory (RAM) 125 and a bulk memory 130 (generally consisting of one or more hard-disks) are associated with the CPU 120. Moreover, a telecommunication control unit (TCU) 135 is used to connect multiple remote terminals 140 and the communication channel 115 to the CPU 120. The reservation subsystem 105 hosts a transactional processing environment, which allows the remote terminals 140 to respond immediately to each request entered by an operator.

The authorisation subsystem 110 consists of a workstation having a RISC architecture. The authorisation subsystem 110 includes a Central Processing Unit (CPU) 150 and a working memory (RAM) 155 that is used directly by the CPU 150. The CPU 150 is associated with a bulk memory consisting of a hard-disk 160 and of a driver unit 165 for reading CD-ROMs 170. Moreover, the CPU 150 is connected to an input unit (IN) 175, which consists for example of a keyboard and a mouse, and to an output unit (OUT) 180, which consists for example of a monitor and a printer. A network interface card (NIC) 185 is used to connect the communication channel 115 to the CPU 150.

The above-described architecture implements a yield management system. Yield management systems are a well-known application field of several Operation Research (OR) techniques. Basically, the goal of a yield management system is that of optimising one or more parameters that can be obtained from a given capacity of a generic service. A demand consisting of multiple types of requests (categories or classes) competes for the offered capacity; each category is defined by a subset of the requests exhibiting similar characteristics (such as a physical property, a fare, a reservation/cancellation behaviour).

The yield management system selects the requests by accepting only the more convenient ones; this is done by assigning a booking limit (authorisation) to each category. The offered capacity may be allocated to the different categories using several techniques. In an out of nesting policy, the offered capacity is simply split among the categories according to their authorisations. This is a very conservative technique, which ensures a pre-set capacity to each category; however, it may lead to a yield loss when the requests for a category are lower than the respective authorisation. Conversely, in a nesting policy the same capacity may be reserved by more than one category; the categories are ranked according to their value, in order to assign a greater capacity to the most valuable ones. Particularly, in a total nesting policy each category may reserve all the capacity assigned to the category itself and to the categories with a lower value. This is a very aggressive technique, which favours the most valuable categories to the detriment of the other ones; however, it provides good results only when the requests for low-fare freights are received before the ones for high-fare freights. Otherwise, in a partial nesting policy each category may reserve the capacity assigned to the categories with a lower value only when the capacity assigned to the category itself has been completely allocated.

In the example at issue, the yield management system is used to maximise a revenue L that can be obtained from a given capacity that is offered by each cargo flight; the offered capacity is defined by two different variables consisting of a total weight Ptot and of a total volume Vtot of the freights that may be transported by the flight. The freights are classified in five categories Ci (with i=1 . . . 5), for example defined as normal light, special light, normal heavy, special heavy, and extra; this number is a good compromise between the opposed requirements of having uniform characteristics within each category (leading to a high number of categories) and a constant behaviour of each category (leading to a low number of categories).

The yield management system employs a partial nesting policy, with two sets of independent authorisations. A set of nesting authorisations Api is used for the weight, with the categories that are ranked in a respective descending nesting order ORDp (from 1 to 5); a set of nesting authorisations Avi is used for the volume, with the categories that are ranked in another independent nesting order ORDv. The partial nesting policy is preferred in this application since the period on which each flight is open for reservation is short, so that the order of the requests is very random. Moreover, it is generally difficult to rank the freights according to their value in an accurate manner, because both the weight and the volume are to be taken into account. In addition, the weight and the volume are not always constraints limiting the offered capacity at the same time.

As described in the following, the weight nesting authorisations Api, the volume nesting authorisations Avi, the weight nesting order ORDp and the volume nesting order ORDv for a future instance of each flight are determined by the authorisation subsystem 110. The authorisation subsystem 110 further supplies a minimum selling price, which consists of a couple of values indicating a weight unitary revenue Mlp and a volume unitary revenue Mlv for each segment of a network supported by the airline, under which a request should be refused because not profitable. The nesting authorisations Api,Avi, the nesting orders ORDp,ORDv and the minimum selling price Mlp,Mlv are transmitted to the reservation subsystem 105 and stored on its hard disk 130. The hard disk 130 further stores booking information BK about every request accepted by the reservation subsystem 105 for the future instance of each flight, such as a date of the accepted request, a weight and a volume of the freights, a name of the client, an applied fare (if already available). The sum of the weight and volume of the accepted requests gives a weight Rpi and a volume Rvi, respectively, already reserved by each i-th category. The reservation subsystem 105 calculates a residual weight Dpi and a residual volume Dvi that are still available for the i-th category according to the following formulas:

$$Rp_i = \min_{j \leq i}\left\{\sum_{k \geq j}(Ap_i - Rp_i)\right\}$$

$$Rv_i = \min_{j \leq i}\left\{\sum_{k \geq j}(Av_i - Rv_i)\right\}$$

The operator at a remote terminal 140 enters a reservation request for a particular flight. The reservation request is accepted if both the weight and the volume of the freights do not exceed the residual weight Dpi and the residual volume Dvi, respectively, of the corresponding category; otherwise, the reservation request is denied. At the same time, the reservation subsystem 105 adds together the minimum selling price of all the segments from an origin to a destination of the request, and multiplies the result by the weight and the volume of the freights; when the revenue of the request (if available) is lower than the value so obtained, the request is always refused. When the reservation request is accepted, it is recorded on the hard disk 130 and the respective residual capacities Dpi,Dvi are accordingly updated. The booking information BK, the reserved capacities Rpi,Rvi and the residual capacities Dpi,Dvi for the future instance of each flight are sent to the authorisation subsystem 110 either periodically (for example at the end of each day) or on request.

Similar considerations apply if the data processing system has a different architecture, for example consisting of a single computer or with the reservation subsystem and the authorisation subsystem working in the INTERNET, if the reservation subsystem and the authorisation subsystem have a different structure, for example if they consist of Personal Computers (PCs) or they are implemented with a local area network, if the freights are classified in a different number of categories, if other categories are envisaged, if a different nesting policy is employed (for example a mixed partial one), and so on.

Figure 2:
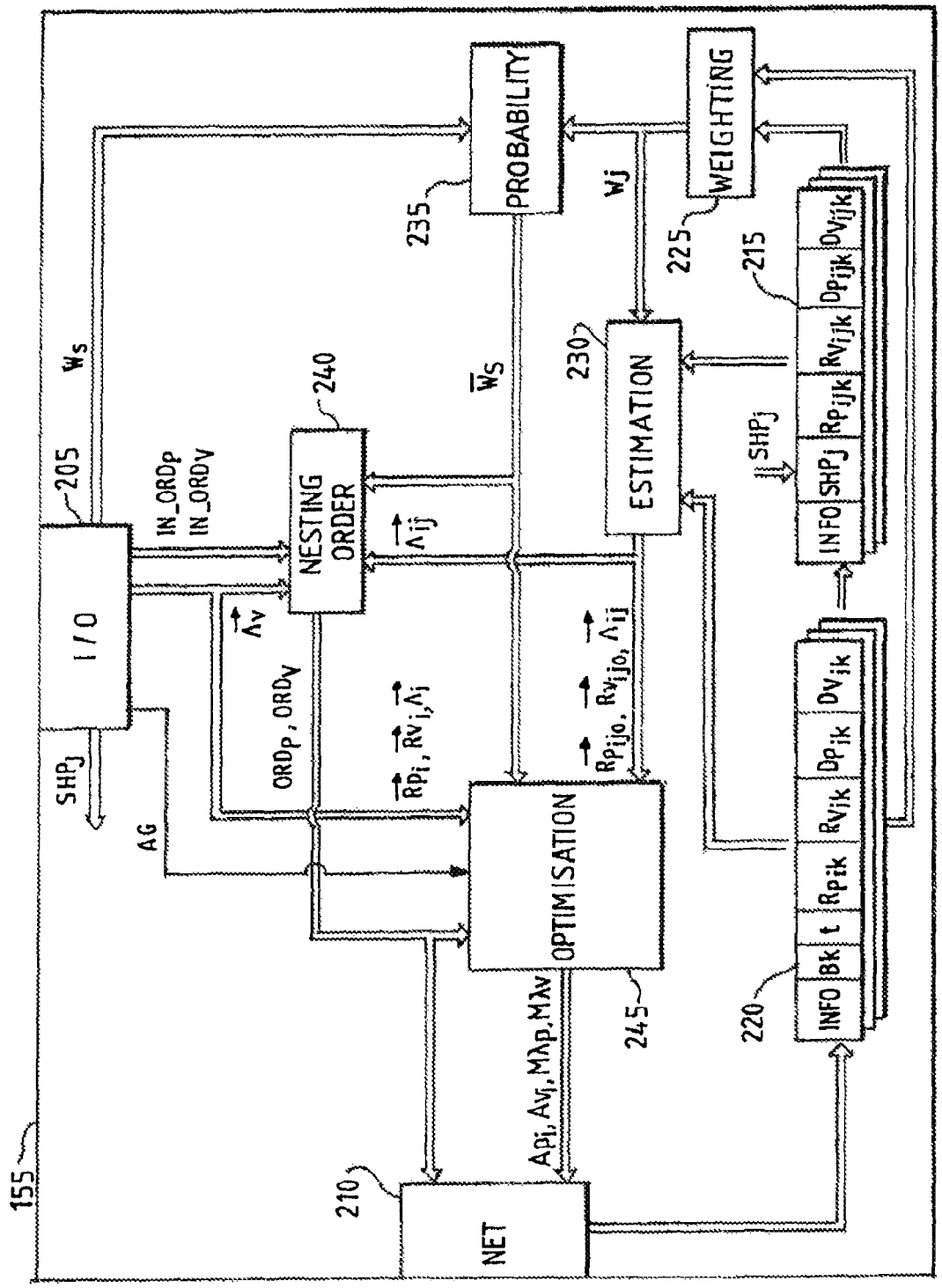
FIG. 2 shows a partial content of a working memory included in the system.
Figure 3A:
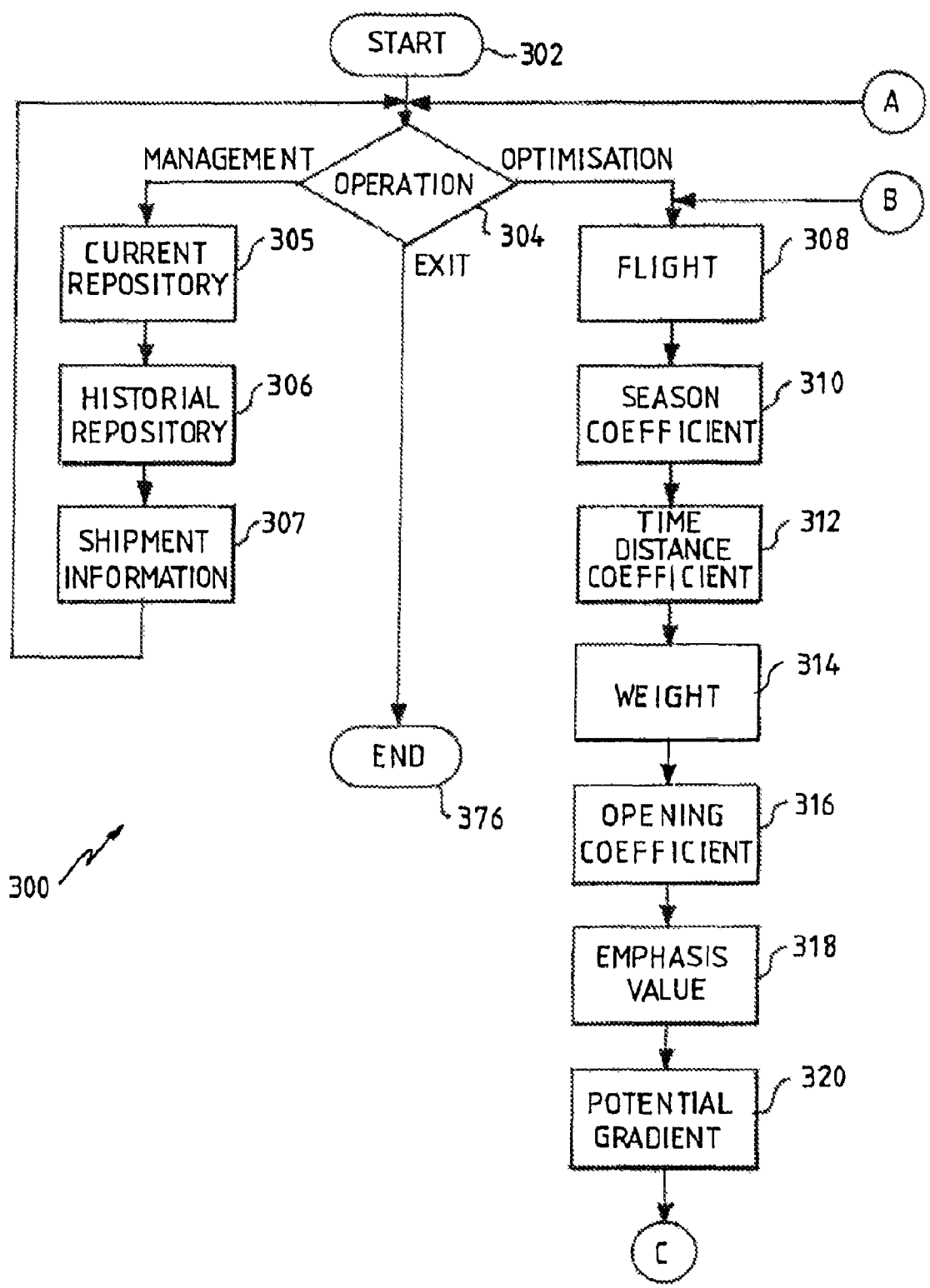
FIG. 3a-3d are a flow chart describing the logic of the yield management method implemented in the system.
Figure 3B:
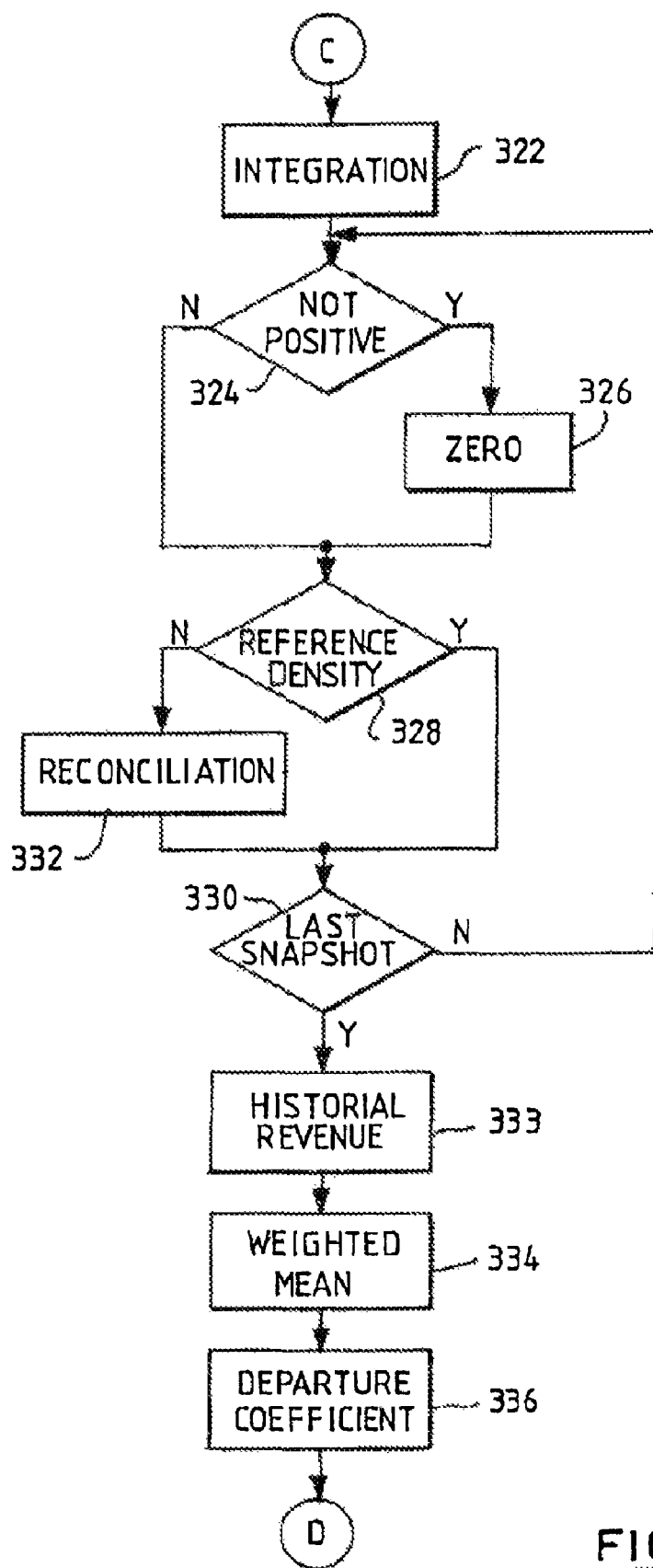
Figure 3C:
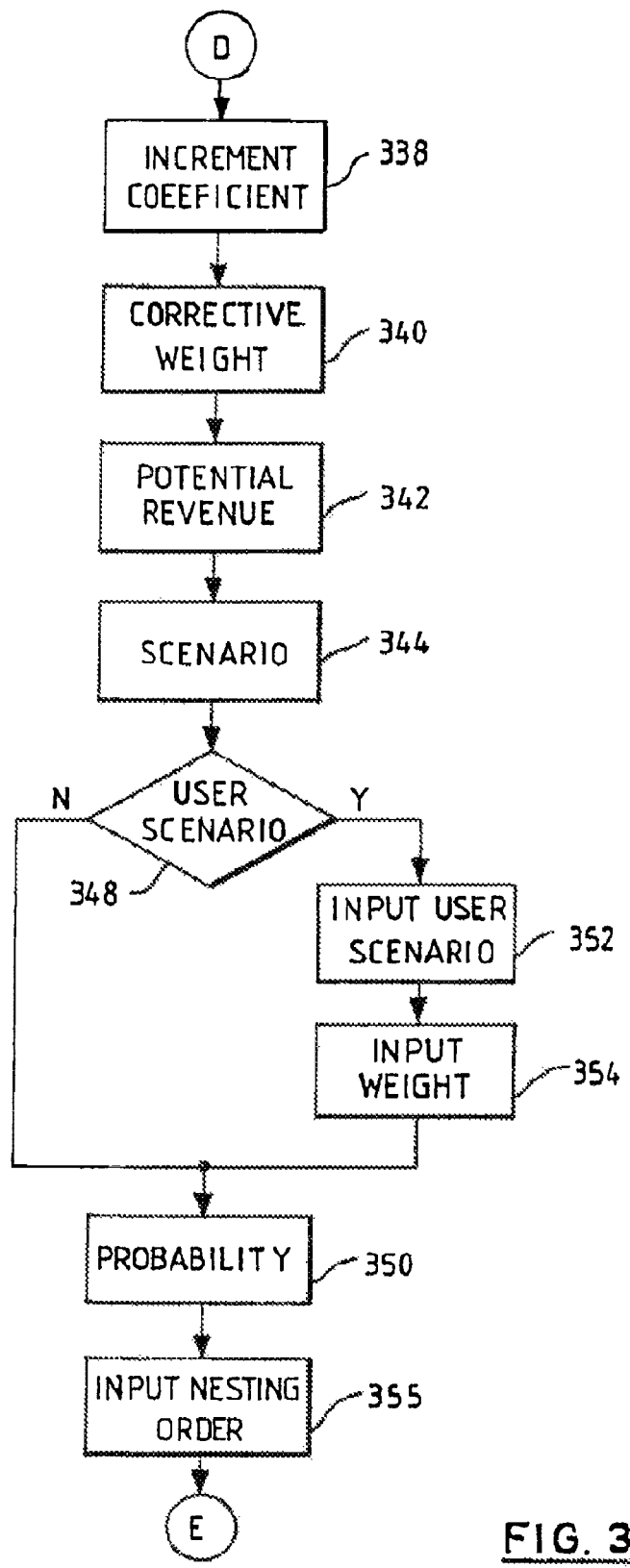
Figure 3D:
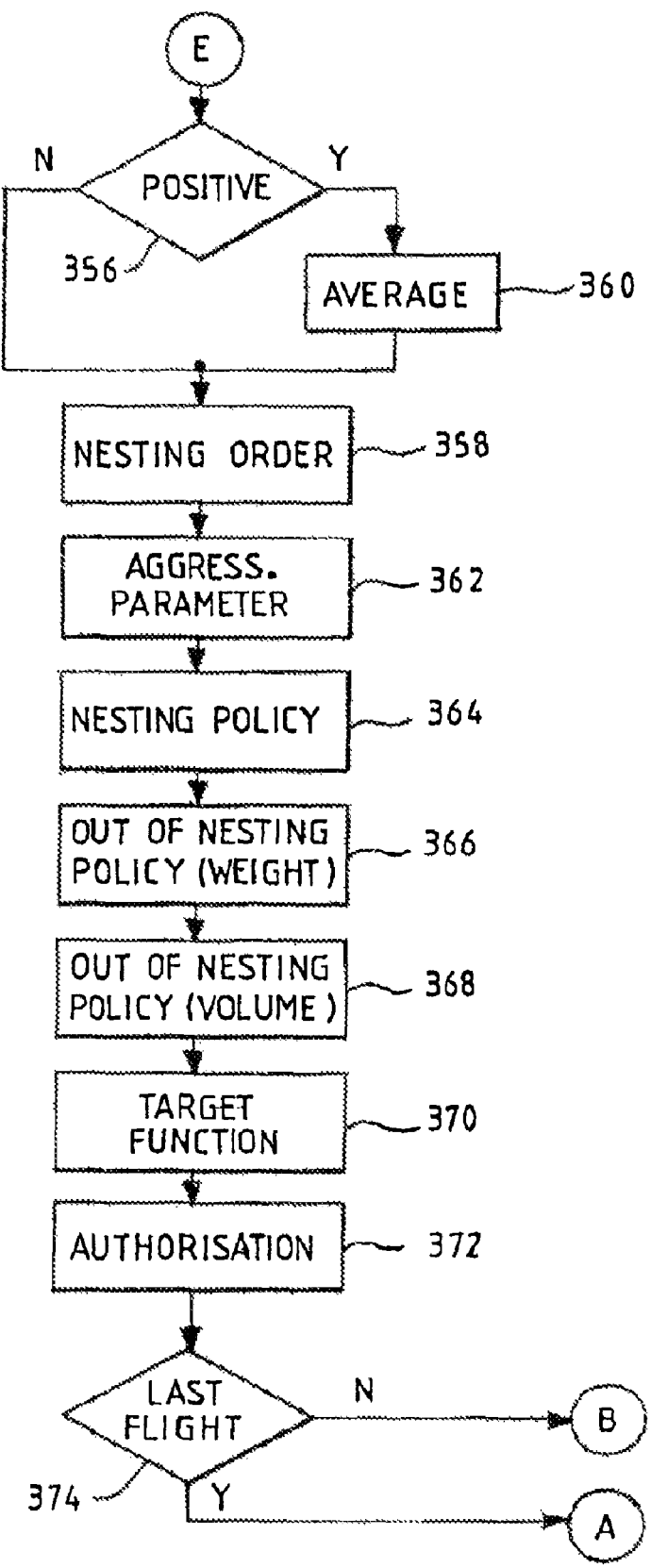

Considering now FIG. 2, there is shown a partial content of the working memory 155 of the authorisation subsystem; the information (programs and data) is typically stored on the hard-disk and loaded (at least partially) into the working memory 155 when the programs are running, together with an operating system and other application programs (not shown in the figure). The programs are initially installed onto the hard disk of the authorisation subsystem from CD-ROM.

An input/output interface (I/O) 205 controls interaction of a space controller with the authorisation subsystem. A network interface (NET) 210 processes a set of protocol layers, which allows the authorisation subsystem to exchange information with the reservation subsystem (through the communication channel).

The working memory 155 stores a historical repository 215 for each flight. The historical repository 215 logs information about a series of previous instances of the flight; preferably, the last 104 previous instances of the flight (one per week in two years) are logged. Particularly, the historical repository 215 includes a field $INFO_j$ (with j=1 ... 104) that identifies the previous instance of the flight (for example its number and departure time), and a field $SPFI_j$ with information about each shipment (for example the weight and the volume of the freights that have been transported, and a fare actually applied). The historical repository 215 further stores a set of historical profiles, which consist of a temporal profile of the weight and of the volume that have been reserved by each category during an opening period of the previous instance of the flight. Each historical weight profile and each historical volume profile is defined by a series of daily snapshots (for example taken at the end of the day); if the previous instance of the flight was open 25 days before its departure, the k-th snapshot (with k=−25 ... 0) for the i-th category in the j-th historical weight profile consists of a reserved weight $Rp_{ijk}$ and a residual weight $Dp_{ijk}$, whereas the same snapshot in the j-th historical volume profile consists of a reserved volume $Rv_{ijk}$ and a residual volume $Dv_{ijk}$; the first snapshot gives the reserved capacity $Rp_{ij\text{-}25}, Rv_{ij\text{-}25}$ and the residual capacity $Dp_{ij\text{-}25}, Dv_{ij\text{-}25}$ at the opening of the previous instance of the flight, whereas a last snapshot gives the reserved capacity $Rp_{ij0}, Rv_{ij0}$ and the residual capacity $Dp_{ij0}, Dv_{ij0}$ at its departure.

The working memory 155 further stores a current repository 220 for the future instance of each flight. Particularly, the current repository 220 includes a field INFO that describes the future instance of the flight (for example the offered capacity $P_{tot}, V_{tot}$ and its scheduled departure time), a field with the corresponding booking information BK, and a field with a current time t at which the information is taken. The current repository 220 further stores a set of current profiles, which consist of a temporal profile of the weight and of the volume that have been currently reserved by each category for the future instance of the flight. Each current weight profile and each current volume profile is defined by a series of daily snapshots. The k-snapshot (with k ranging from −25 to the current time t) for the i-th category in the current weight profile consists of a reserved weight $Rp_{ik}$ and a residual weight $Dp_{ik}$, whereas the same snapshot in the current volume profile consists of a reserved volume $Rv_{ik}$ and a residual volume $Dv_{ik}$; the last snapshot gives the reserved capacity $Rp_{it}, Rv_{it}$ and the residual capacity $Dp_{it}, Dv_{it}$ at the current time t.

The booking information BK, the current reserved capacities $Rp_{it}, Rv_{it}$ and the current residual capacities $Dp_{it}, Dv_{it}$ are received from the reservation subsystem through the network interface 210. The set of profiles stored in the current repository 220 for each flight are copied to the corresponding set of profiles in the historical repository 215 after departure of the flight; the shipment field $SHP_j$ is continually updated by the input/output interface 205 as soon as the corresponding information becomes available.

The historical repository 215 and the current repository 220 are accessed by a weighting module 225, which assigns a weight $w_j$ to each previous instance of the flight. The weight $w_j$ depends on a relevance of the previous instance of the flight with respect to its future instance.

The weights $w_j$ are input to an estimation module 230, which further accesses the historical repository 215 and the current repository 220. The estimation module 230 determines a potential (weight and volume) profile from each corresponding historical profile. The potential profile is obtained adjusting the historical profile according to the respective current profile and an estimated unconstrained (or untruncated) demand of the respective capacity variable for the category in the old instance of the flight. The unconstrained demand takes into account the periods of time in which the category has been closed to sales (because the reserved weight and/or the reserved volume for the category have reached their booking limits defined by the respective nesting authorisations), and estimates a demand not limited by the offered capacity. The estimation of the unconstrained demand is carried out independently for the weight and for the volume. Each potential profile consists of 25 snapshots; the k-th snapshot for the i-th category in the j-th potential weight profile consists of a potential weight request $\vec{Rp}_{ijk}$, whereas the same snapshot in the j-th potential volume profile consists of a potential volume request $\vec{Rv}_{ijk}$. The last snapshot of the potential weight profile and of the potential volume profile define a final potential weight request $\vec{Rp}_{ij0}$ and a final potential volume request $\vec{Rv}_{ij0}$, respectively, for each i-th category in the j-th previous instance of the flight.

The estimation module 230 further determines a potential revenue $\vec{\Lambda}_{ij}$ for each i-th category transported by the j-th previous instance of the flight. The potential revenue is estimated according to the revenue of the category in the previous instance of the flight; this value is further adjusted to take into account the revenue of the corresponding capacity currently reserved for the future instance of the flight.

The estimation module 230 outputs a series of historical scenarios for each flight. The j-th scenario consists of the corresponding final potential weight request $\vec{Rp}_{ij0}$, final potential volume request $\vec{Rv}_{ij0}$, and potential revenue $\vec{\Lambda}_{ij}$ for each i-th category. The space controller defines a user scenario through the input/output interface 205. The user scenario consists of a potential weight request $\vec{Rp}_i$, a potential volume request $\vec{Rv_i}$, and a potential revenue $\vec{\Lambda_i}$, which are independently forecast by the space controller for each i-th category. A weight w is assigned to the user scenario by the space controller through the input/output interface 205.

The weight $w_i$ of each historical scenario $\{\vec{Rp_{ij0}}, \vec{Rv_{ij0}}, \vec{\Lambda_{ij}}\}$ and the weight w of the user scenario $\{\vec{Rp_i}, \vec{Rv_i}, \vec{\Lambda_i}\}$, which will be denoted as a whole with $w_s$ in the following, are input to a normalisation module 235. The normalising module 235 determines a probability $\overline{w_s}$ of each (historical and user) scenario.

The probabilities $\overline{w_s}$ are input to a nesting order module 240, which also receives the potential revenues $\vec{\Lambda_{ij}}$ of each historical scenario from the estimation module 230 and the potential revenues of the user scenario from the input/output interface 205. An input weight nesting order IN_ORDp and an input volume nesting order IN_ORDv are provided by the space controller thorough the input/output interface 205, and then transmitted to the nesting order module 240. The nesting order module 240 outputs the nesting orders ORDp,ORDv for the future instance of the flight.

The nesting orders ORDp,ORDv are provided to an optimisation module 245;

the optimisation module 245 further receives the historical scenarios $\{\vec{Rp_{ij0}}, \vec{Rv_{ij0}}, \vec{\Lambda_{ij}}\}$ from the estimation module 230 and the user scenario $\{\vec{Rp_i}, \vec{Rv_i}, \vec{\Lambda_i}\}$ from the input/output interface 205, together with the respective probabilities from the normalisation module 235. The space controller supplies an aggressiveness parameter AG, indicative of an attitude to the risk, to the optimisation module 245 through the input/output interface 205. The optimisation module 245 employs stochastic programming techniques to determine the (optimal) nesting authorisations $Ap_i, Av_i$ that maximise a potential revenue of the future instance of the flight.

Stochastic programming techniques are commonly used as a support in decision-making processes under uncertainty, such as in financial trading. An example of stochastic programming technique is described in "IBM Stochastic Solution", Tito A. Ciriani, Stefano Gliozzi, AIROnews Bulletin of AIRO, VI, n.1—Spring 2000, pp. 6-10. In particular, the module 245 optimises each scenario using a deterministic linear programming technique; the results are then combined weighting each scenario according to the respective probability.

Similar considerations apply if a whole application program (defined by the different modules described above) and the corresponding data are structured in a different manner, if other functions are provided, if the historical and current repository are replaced by equivalent memory structures, and so on.

With reference now to FIG. 3a-3d, the application program when running on the authorisation subsystem performs a method 300. The method starts at block 302 and then passes to block 304, wherein a menu with a series of possible choices is displayed on the monitor of the authorisation subsystem.

The method carries out the operations corresponding to the selected choice. Particularly, if the space controller has selected a management function, the blocks 305-307 are executed, whereas if the space controller has selected an optimisation function, the blocks 308-374 are executed; conversely, if the space controller has selected an exit option the method ends at the final block 376.

Considering now block 305 (management function), the information about the future instance of the flight is received from the reservation subsystem, and it is stored into the current repository. The method passes to block 306, wherein the set of profiles stored in the current repository are copied to the historical repository after departure of the flight. Continuing to block 307, the information about a selected shipment for the previous instance of the flight is updated as soon as it is available. The method then returns to block 304 waiting for a new command.

With reference to block 308 (optimisation function), a flight is selected either automatically (in a batch processing of all the flights of the airline) or by the space controller (in an interactive processing).

The method then assigns the corresponding weight $w_j$ to the previous instances of the flight. Particularly, a season coefficient $ws_j$ for each j-th previous instance of the flight is calculated at block 308. The coefficient $ws_j$ depends on a season of the previous instance of the flight, that is on a difference between a period of the previous instance of the flight and its future instance; the more the previous instance of the flight has happened in a similar period of the year as its future instance, the more the season coefficient $ws_j$ is bigger. The season coefficient $ws_j$ is obtained from a matrix having 52 rows and 52 columns, which is preferably symmetric; each element [u,v] of the matrix (with u,v=1 . . . 52) stores the season coefficient $ws_j$ of a previous instance of the flight that departed in the u-th week of the year, for a future instance of the flight that will depart in the v-th week of the year; the season coefficients $ws_j$ have a value ranging from 0 to 1, with all the diagonal elements of the matrix (u=v) that are equal to 1.

Descending into block 312, a time distance coefficient $wg_j$ for each j-th previous instance of the flight is calculated. The coefficient $wg_j$ depends on a space between the current time and the departure of the previous instance of the flight; the more recent the previous instance of the flight is, the bigger the time distance coefficient $wg_j$ is. The time distance coefficient $wg_j$ is defined as a hyperbolic function of a number of days g that have passed from the departure of the previous instance of the flight. We set $wg_j=1$ for $g=0$ and $wg_j=a_1$ for $g\to\infty$ (with $0\leq a_1<1$, and preferably $a_1=0$); moreover, we set an exponent $a_2$ of the exponential law (with $a_2<1$, and preferably $a_2=0.2$), and a scale coefficient $a_3$ for reducing a concavity of the hyperbola (with $a_3\geq 30$, and preferably $a_3=30$). The time distance coefficient $wg_j$ is then given by:

$$wg_j = a_1 + \frac{1}{\left[\frac{g}{a_3} + \left(\frac{1}{1-a_1}\right)^{\frac{1}{a_2}}\right]^{a_2}}$$

This results in a time distance coefficient $wg_j \cong 0.53$ for g=708 (2 years), so as to give more relevance to the most recent previous instances of the flight, while maintaining some relevance for the oldest previous instances of the flight at the same time.

The weight $w_j$ for each j-th previous instance of the flight is then calculated at block 314, by combining the corresponding season coefficient $ws_j$ and time distance coefficient $wg_j$. Particularly, the value $w_j$ is calculated as a sum of the coefficients $ws_j$ and $wg_j$, which are weighted according to a parameter h with a value between 0 and 1, and preferably equal to 0.65:

$$w_j = h \cdot ws_j + (1-h) \cdot wg_j$$

Considering now block 316, an opening coefficient $a_{ijk}$ for each k-th snapshot of the i-th category in the j-th previous instance of the flight is estimated; the opening coefficient $a_{ijk}$ indicates a percentage of time during which the category has been open to sales during a period associated with the snapshot, that is from a preceding snapshot (k−1) to a current snapshot (k).

Figure 4A:
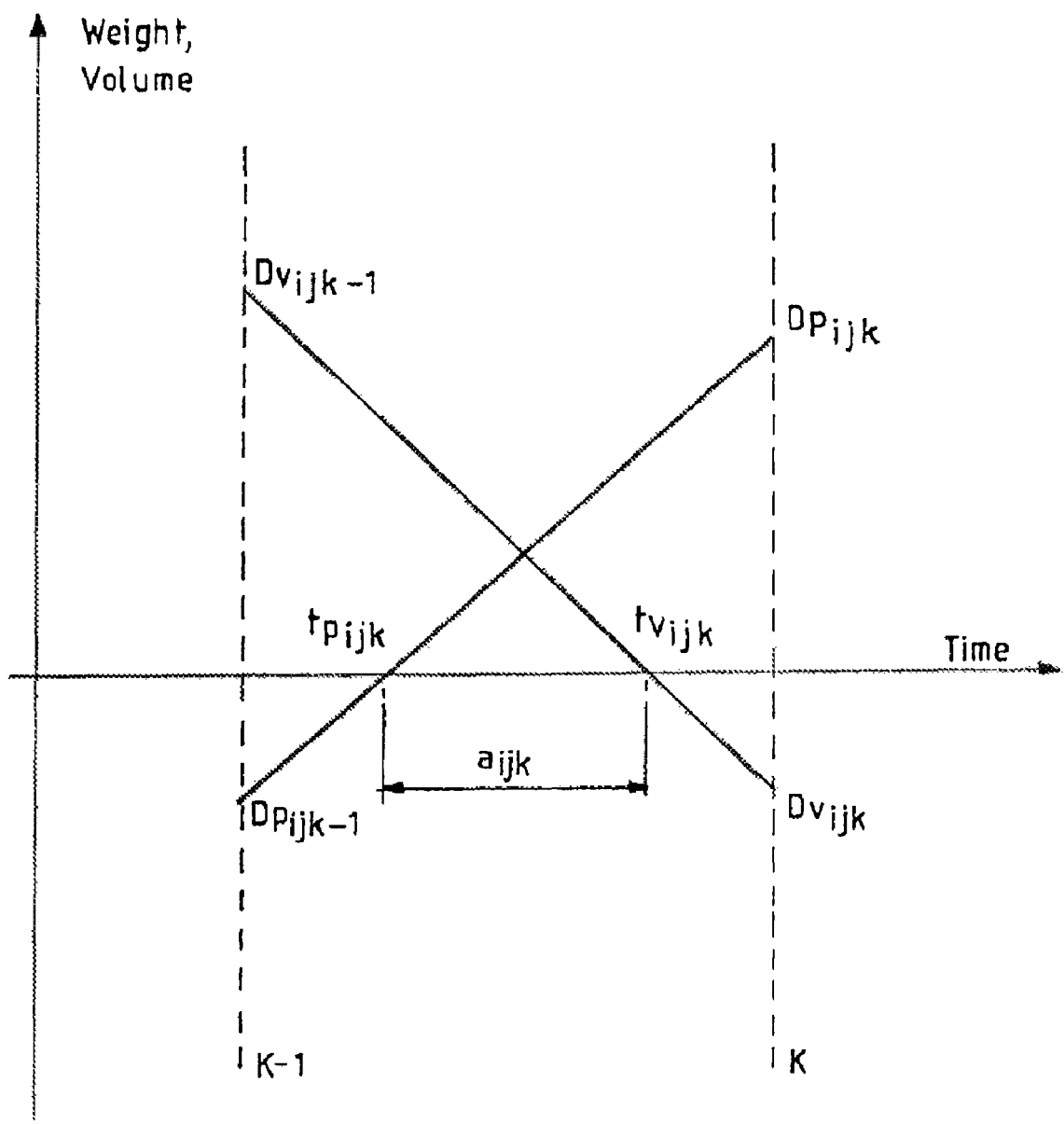
FIG. 4a-4b depict different diagrams of some variables involved in the method.

As shown in FIG. 4a, the category is open only when the residual weight and the residual volume are both positive. We denoted with $s^+(f)$ a function that determines the sign of its argument f, that is:

$$s^+(f) = \begin{cases} 0 \text{ if } f \leq 0 \\ 1 \text{ if } f > 0 \end{cases}$$

The starting conditions that are used (in the given order) to determine whether the category has been always open or always closed are:

$$a_{ijk} = \begin{cases} 1 \text{ if } s^+(Dp_{ijk-1}) = s^+(Dp_{ijk}) = s^+(Dv_{ijk-1}) = s^+(Dv_{ijk}) = 1 \\ 0 \text{ if } s^+(Dp_{ijk-1}) = s^+(Dp_{ijk}) = 0 \text{ or } s^+(Dv_{ijk-1}) = s^+(Dv_{ijk}) = 0 \end{cases}$$

Otherwise, we calculate the sign of the derivative of the functions defined by the residual weight and the residual volume:

$$sp'_{ijk} = s^+(Dp_{ijk}) - s^+(Dp_{ijk-1})$$

$$sv'_{ijk} = s^+(Dv_{ijk}) - s^+(Dv_{ijk-1})$$

When $sp'_{ijk}, sv'_{ijk} \neq 0$, the intersection of these functions with a time axis is given by:

$$tp_{ijk} = \frac{Dp_{ijk-1}}{Dp_{ijk-1} - Dp_{ijk}}$$

$$tv_{ijk} = \frac{Dv_{ijk-1}}{Dv_{ijk-1} - Dv_{ijk}}$$

We now define the following functions:

$$\overline{tp_{ijk}} = \begin{cases} tp_{ijk} & \text{if } sp'_{ijk} = -1 \\ 1 - tp_{ijk} & \text{if } sp'_{ijk} = +1 \end{cases}$$

$$\overline{tv_{ijk}} = \begin{cases} tv_{ijk} & \text{if } sv'_{ijk} = -1 \\ 1 - tv_{ijk} & \text{if } sv'_{ijk} = +1 \end{cases}$$

If we consider all the possible cases, we can demonstrate that:

$$a_{ijk} = \begin{cases} \overline{tp_{ijk}} \text{ if } sp'_{ijk} \neq 0 \text{ and } sv'_{ijk} = 0 \\ \overline{t_v} \text{ if } sv'_{ijk} \neq 0 \text{ and } sp'_{ijk} = 0 \\ \min\{\overline{tp_{ijk}}, \overline{tv_{ijk}}\} \text{ if } sp'_{ijk} \cdot sv'_{ijk} > 0 \\ \max\{0, (\overline{tp_{ijk}} + \overline{tv_{ijk}}) - 1\} \text{ otherwise} \end{cases}$$

The method continues to block 318, wherein a weight emphasis value $Ep_{ik}$ and a volume emphasis value $Ev_{ik}$ to be applied to the k-th snapshot for each i-th category (irrespective of the old instance of the flight) are calculated; the emphasis values $Ep_{ik}, Ev_{ik}$ indicate what could have happened if the category had been always open to sales in the period associated with the k-th snapshot. The emphasis is calculated as a function of observations consisting of the demand of the respective category in the corresponding historical profiles where the category was open in the same period.

The method takes into account all the corresponding (weight or volume) historical profiles for the same category, which were always open in the period ($a_{ijk}=1$). Further historical profiles (with a decreasing value of the opening coefficient $a_{ijk}$) are also taken into account, if necessary, in order to ensure a sufficient number of observations (for example at least equal to 30% of the number of the previous instances of the flight). If we denote with $P'_{ijk}=P_{ijk}-P_{ijk-1}$ and with $V'_{ijk}=V_{ijk}-V_{ijk-1}$ gradient of the reserved weight and of the reserved volume, respectively, the emphasis values $Ep_{ik}, Ev_{ik}$ are defined as a weighted mean of these values:

$$Ep_{ik} = \frac{\sum_j w_{ijk} \cdot P'_{ijk}}{\sum_j w_{ijk}}$$

$$Ev_{ik} = \frac{\sum_j w_{ijk} \cdot V'_{ijk}}{\sum_j w_{ijk}}$$

Passing to block 320, the method estimates a potential weight gradient $Up_{ijk}$ and a potential volume gradient $Uv_{ijk}$ for each k-th snapshot of the i-th category in the j-th historical weight profile and historical volume profile, respectively. The potential gradients $Up_{ijk}, Uv_{ijk}$ are obtained as a linear interpolation between the value $P'_{ijk}, V'_{ijk}$ for $a_{ijk}=1$ and the value $\max[P'_{ijk}, Ep_{ijk}], \max[V'_{ijk}, Ev_{ijk}]$ for $a_{ijk}=0$, that is:

$$Up_{ijk} = \max[P'_{ijk}, Ep_{ijk} + a_{ijk} \cdot (P'_{ijk} - Ep_{ijk})]$$

$$Uv_{ijk} = \max[V'_{ijk}, Ev_{ijk} + a_{ijk} \cdot (V'_{ijk} - Ev_{ijk})]$$

Figure 4B:
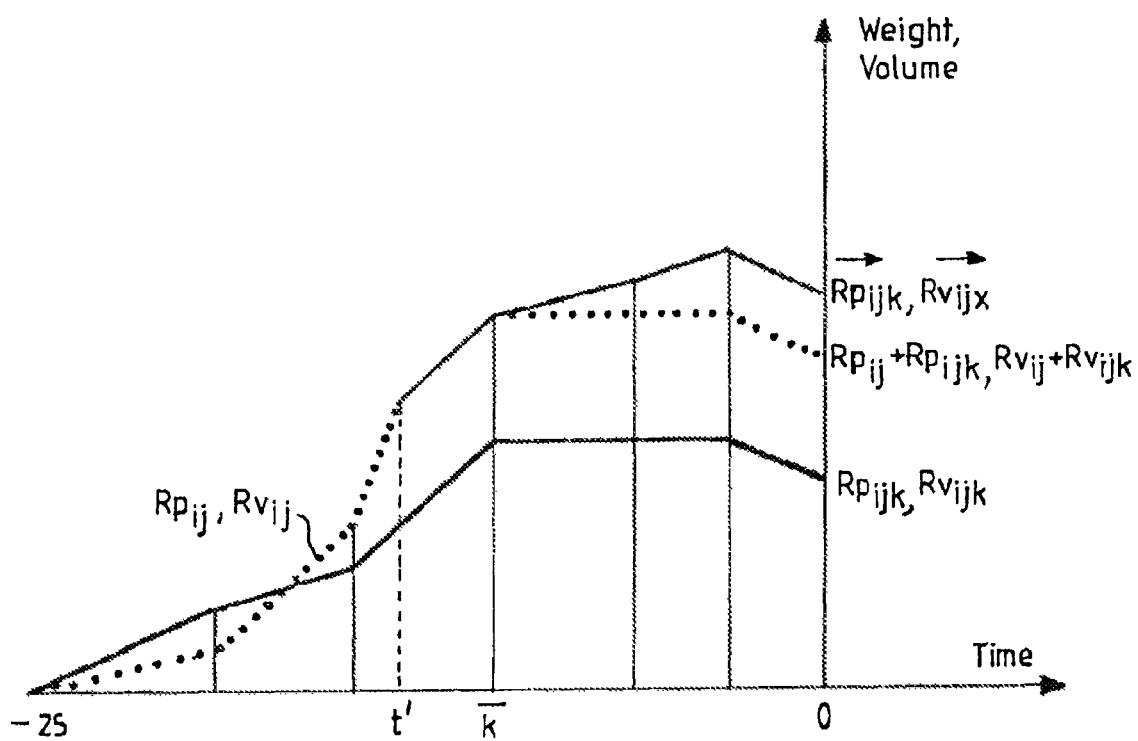

The method then builds each potential profile. As shown in FIG. 4b, the potential profile is set to the respective current profile up to a time t' corresponding to the current time t. Considering now block 322, the next snapshot for the i-th category in the j-th potential weight profile is calculated integrating the potential weight gradient $Up_{ijk}$, whereas the same snapshot for the i-th category in the j-th volume profile is calculated integrating the potential volume gradient $Uv_{ijk}$; the integration is carried out with a simple sum, that is $\vec{Rp}_{ijk} = \vec{Rp}_{ijk-1} + Up_{ijk}$ and $\vec{Rv}_{ijk} = \vec{Rv}_{ijk-1} + Uv_{ijk}$, respectively. The potential gradients relating to the period including the time t' are reduced to take into account the time that has passed from the preceding snapshot; we denote with $\bar{k}$ an index of the snapshot immediately following the time t'; if $g_t$ and $g_{\bar{k}}$ are the number of hours from the time t' and from the $\bar{k}$-th snapshot to the departure of the previous instance of the flight, respectively, the potential gradients $Up_{ij\bar{k}}, Uv_{ij\bar{k}}$ are reduced according to the following formulas:

$$Up_{ij\bar{k}} \leftarrow Up_{ij\bar{k}} \cdot \frac{g_{\bar{k}} - g_t}{g_{\bar{k}} - g_{\bar{k}-1}}$$

$$Uv_{ij\bar{k}} \leftarrow Uv_{ij\bar{k}} \cdot \frac{g_{\bar{k}} - g_t}{g_{\bar{k}} - g_{\bar{k}-1}}$$

The method then checks at block 324 whether either the resulting potential weight request $\vec{P}_{ijk}$ or the resulting potential volume request $\vec{V}_{ijk}$ for the current snapshot is not strictly positive ($\geq 0$). If so, the method descends into block 326, wherein the potential weight request $\vec{P}_{ijk}$ and the potential volume request $\vec{V}_{ijk}$ are both set to zero; the method then continues to block 328. Conversely, if both the resulting potential weight request $\vec{P}_{ijk}$ and the resulting potential volume request $\vec{V}_{ijk}$ are strictly positive, the method passes to block 328 directly. In other words, the potential weight capacity $\vec{P}_{ijk}$ and the potential volume capacity $\vec{V}_{ijk}$ (with k=t, $\overline{k}$, . . . 0) for the current snapshot are given by:

$$\vec{P}_{ijk} = \begin{cases} \vec{P}_{ijk-1} + Up_{ijk} & \text{if } \vec{P}_{ijk-1} + Up_{ijk} > 0 \text{ and } \vec{V}_{ijk-1} + Uv_{ijk} > 0 \\ 0 & \text{otherwise} \end{cases}$$

$$\vec{V}_{ijk} = \begin{cases} \vec{V}_{ijk-1} + Uv_{ijk} & \text{if } \vec{P}_{ijk-1} + Up_{ijk} > 0 \text{ and } \vec{V}_{ijk-1} + Uv_{ijk} > 0 \\ 0 & \text{otherwise} \end{cases}$$

With reference now to block 328, the result is further corrected by reconciling the potential weight request $\vec{P}_{ijk}$ and the potential volume request $\vec{V}_{ijk}$ of the current snapshot, in order to resolve any inconsistency that may be introduced between the two capacity variables and that may bring about incongruent values of a density of the potential request. We denote with $$\delta_{ijk} = \frac{P_{ijk}}{V_{ijk}}$$

the density of the reserved capacity for the i-th category in the k-th snapshot of the j-th previous instance of the flight, and with $$\vec{\delta}_{ijk} = \frac{\vec{P}_{ijk}}{\vec{V}_{ijk}}$$

the density of the potential capacity for the same snapshot. If the density $\vec{\delta}_{ijk}$ for the current snapshot is comprised between $\delta_{ijk}$ and $\vec{\delta}_{ijk-1}$, not reconciliation is carried out and the method descends into block 330 (described in the following).

Otherwise, the potential demand is correct to an admissible reference density $R\delta_{ijk}$ at block 332. The reference density $R\delta_{ijk}$ is set to the value between $\delta_{ijk}$ and $\vec{\delta}_{ijk-1}$ that is closer to $\vec{\delta}_{ijk}$. Particularly, the potential weight request $\vec{Rp}_{ijk}$ and the potential volume request $\vec{Rp}_{ijk}$ are reconciled according to the following formula:

$$\vec{P}_{ijk} \leftarrow \frac{1}{2}(\vec{P}_{ijk} + \vec{V}_{ijk} \cdot R\delta_{ijk})$$

$$\vec{V}_{ijk} \leftarrow \frac{1}{2}\left(\vec{V}_{ijk} + \frac{\vec{P}_{ijk}}{R\delta_{ijk}}\right)$$

Considering now block 330, the method checks whether the last snapshot (associated with the departure of the old instance of the flight) has been reached. If not, the method returns to block 324 for processing a next snapshot.

Conversely, the method descends into block 333, wherein a historical revenue $\Lambda_{ij}$ for the i-th category transported by the j-th previous instance of the flight is calculated by summing a value of the respective shipments. The historical revenue $\Lambda_{ij}$ may be calculated only when the value of all the shipments for the category are known; otherwise, if the value of one or more shipments is not available, the historical revenue $\Lambda_{ij}$ for the whole category is deemed unknown. In a similar manner, a current revenue $\Lambda_i$ for the i-th category in the future instance of the flight is calculated by summing a value of the respective requests accepted at the current time t.

In the cargo flights, the freight fares are defined according to a so-called taxable weight $P^*$; the taxable weight $P^*$ is a virtual weight of the freights that is applied to calculate their value for a given unit weight fare. We denote with $\Delta^*$ a reference density (for example $\Delta^*=167$ kg/m$^3$). If a density $\delta$ of the freights is equal to or higher than $\Delta^*$ (heavy freights) the taxable weight $P^*$ of the freights is equal to their real weight; otherwise, if the density $\delta$ of the freights is lower than $\Delta^*$ (light freights), the taxable weight $P^*$ of the freights is obtained multiplying their volume by the reference density $\Delta^*$:

$$P^* = \max(P, V \cdot \Delta^*)$$

A (weight) unit revenue $\lambda$ is then calculated as $$\lambda = \frac{\Lambda}{P^*}$$

We define a historical taxable weight for each i-th category in the j-th previous instance of the flight as $Rp_{ij0}^* = \max(Rp_{ij0}, Rv_{ij0} \cdot \Delta^*)$, and a current taxable weight for each i-th category as $Rp_{it}^* = \max(Rp_{it}, Rv_{it} \cdot \Delta^*)$; it is then possible to calculate a historical unit revenue $\lambda_{ij}$ for each i-th category in the j-th previous instance of the flight a current unit revenue $\lambda_i$ for each i-th category in the future instance of the flight by applying the above mentioned formula, that is $$\lambda_{ij} = \frac{\Lambda_{ij}}{Rp_{ij0}^*} \text{ and } \lambda_i = \frac{\Lambda_i}{Rp_{it}^*},$$

respectively.

Proceeding to block 334, the historical unit revenues $\lambda_{ij}$, for each i-th category in the j-th previous instance of the flight wherein the respective historical revenue $\Lambda_{ij}$ is unknown, are set to the weighted mean of the respective values $\lambda_{ij}$ available, that is:

$$\lambda_{ij} = \frac{\sum_j w_j \cdot \lambda_{ij}}{\sum_j w_j}$$

The method then estimates a potential unit revenue $\vec{\lambda}_{ij}$ for each i-th category in the j-th previous instance of the flight, by adjusting the corresponding historical unit revenue $\lambda_{ij}$ according to the corresponding current unit revenue $\lambda_i$. Particularly, a departure coefficient wd for the future instance of the flight is calculated at block 336. The coefficient wd depends on a space between the current time t and the departure of the future instance of the flight. The more the current time is close to the departure, the bigger the coefficient wd is. We assume that the current unit revenue $\lambda_i$ does not affect the historical unit revenue $\lambda_{ij}$ when the number of days to the departure of the future instance of the flight is greater than a pre-set value $g_m$ (for example $g_m=10$). If we denote with $g_d$ the number of days from the current time t to the departure of the future instance of the flight, the departure coefficient wd is given by:

$$wd = \min\left(1, \frac{g_d}{g_m}\right)$$

Passing to block 338, an increment coefficient $wx_{ij}$ for each i-th category in the j-th previous instance of the flight is further calculated. The coefficient $wx_{ij}$ depends on an increment of the potential capacity at the departure for the i-th category in the j-th previous instance of the flight with respect to the current reserved capacity. We define a potential taxable weight for each i-th category in the j-th previous instance of the flight as $\overrightarrow{P_{ij0}^*} = \max(\overrightarrow{Rp_{ij0}}, \overrightarrow{Rp_{ij0}} \cdot \Delta^*)$; the increment coefficient $wx_{ij}$ is then given by the following formula:

$$wx_{ij} = \begin{cases} \max\left(0, \frac{\overrightarrow{P_{ij0}^*} - P_{it}^*}{\overrightarrow{P_{ij0}^*}}\right) & \text{if } \overrightarrow{P_{ij0}^*} > 0 \\ 0 & \text{otherwise} \end{cases}$$

A corrective factor $wc_{ij}$ for each i-th category in the j-th previous instance of the flight is then calculated at block 340, by combining the corresponding departure coefficient wd and increment coefficient $wx_{ij}$. Particularly, the corrective factor $wc_j$ is calculated as a sum of the coefficients wd and $wx_{ij}$, which are weighted according to a parameter hc having a value between 0.5 and 1, and preferably equal to 0.6:

$$wc_{ij} = hc \cdot wx_{ij} + (1-hc) \cdot wd$$

The potential unit revenue $\overrightarrow{\lambda_{ij}}$ for the i-th category in the j-th old instance of the flight is then calculated at block 342 as a sum of the corresponding historical unit revenue $\lambda_{ij}$ and current unit revenue $\lambda_i$, which are weighted according to the corrective factor $wc_{ij}$, that is:

$$\overrightarrow{\lambda_{ij}} = wc_{ij} \cdot \lambda_{ij} + (1-wc_{ij}) \cdot \lambda_i$$

The potential revenue $\overrightarrow{\Lambda_{ij}}$ for each i-th category in the j-th old instance of the flight is simply obtained as $\overrightarrow{\Lambda_{ij}} = \overrightarrow{\lambda_{ij}} \cdot \overrightarrow{Rp_{ij0}^*}$.

Proceeding to block 344, the historical scenarios $\{\overrightarrow{Rp_{ij0}}, \overrightarrow{Rv_{ij0}}, \overrightarrow{\Lambda_{ij}}\}$ are determined for each old instance of the flight. The method then checks at block 348 whether the space controller wishes to input a user scenario. If not, the method descends into block 350 (described in the following). Conversely, the space controller inputs the user scenario $\{\overrightarrow{Rp_i}, \overrightarrow{Rv_i}, \overrightarrow{\Lambda_i}\}$ at block 352 and inputs its weight w at block 354; the method then passes to block 350.

Considering now block 350, the probability $\overline{w_s}$ of each (historical and user) scenario is calculated normalising the corresponding weight $w_s$, that is:

$$\overline{w_s} = \frac{w_s}{\sum_{i=1}^{104,user} w_i}.$$

The method then proceeds to block 355, wherein the input nesting orders IN_ORDp,IN_ORDv are provided by the space controller. Descending into block 356, the method checks whether for each i-th category some of the j-th historical scenarios have the final potential weight request $\overrightarrow{Rp_{ij0}}$, the final potential volume request $\overrightarrow{Rv_{ij0}}$ and the potential revenue $\overrightarrow{\Lambda_{ij}}$ all strictly positive. If not, the method passes to bock 358 (described in the following). Conversely, the method enters block 360, wherein a potential weight revenue $$\overrightarrow{\lambda p_{is}} = \frac{\overrightarrow{\Lambda_{is}}}{\overrightarrow{Rp_{is0}}}$$

and a potential volume revenue $$\overrightarrow{\lambda v_{is}} = \frac{\overrightarrow{\Lambda_{is}}}{\overrightarrow{Rv_{is0}}}$$

are calculated for each i-th category that meets the above mentioned conditions (taking into consideration all the historical scenarios and the user scenario). A corresponding mean weight revenue $\hat{\overrightarrow{\lambda p_i}}$ and a corresponding mean volume revenue $\hat{\overrightarrow{\lambda v_i}}$ are then calculated for these categories as a weighted mean of the potential weight revenues $\overrightarrow{\lambda p_{is}}$ and the potential volume revenues $\overrightarrow{\lambda v_{is}}$ respectively:

$$\hat{\overrightarrow{\lambda p_i}} = \frac{\sum_s \overline{w_s} \cdot \overrightarrow{\lambda p_{is}}}{\sum_s \overline{w_s}}$$

$$\hat{\overrightarrow{\lambda v_i}} = \frac{\sum_s \overline{w_s} \cdot \overrightarrow{(\lambda v)_{is}}}{\sum_s \overline{w_s}}$$

The method then passes to block 358.

Considering now block 358, the position of each category in the nesting orders ORDp,ORDv is then determined. For each capacity variable (weight and volume), the categories that do not have a respective mean revenue maintain their position in the input nesting orders IN_ORDp,IN_ORDv. The other categories having a respective mean revenue $\hat{\overrightarrow{\lambda p_i}}$, $\hat{\overrightarrow{\lambda v_i}}$ are ranked in a corresponding descending order within the available positions. For example, let us suppose that the input weight nesting order for the five categories is IN_ORDp=$\{C_2,C_4,C_3,C_5,C_1\}$. The categories $C_2$, $C_3$ and $C_5$ are ranked in the order $\{C_3,C_5,C_2\}$ according to their respective mean weight revenues $\hat{\overrightarrow{\lambda p_3}}, \hat{\overrightarrow{\lambda p_5}}, \hat{\overrightarrow{\lambda p_1}}$; conversely, the mean weight revenue $\hat{\overrightarrow{\lambda p_4}}$ (for the category $C_4$) and the mean weight revenue $\hat{\lambda}\vec{p_1}$ (for the category $C_1$) are not available. In this case, the resulting weight nesting order is ORDp={$C_3,C_4,C_5,C_2,C_1$}.

The method then proceeds to block 362, wherein the aggressiveness parameter AG is input by the space controller. The method builds a stochastic model that maximises a target function defined by the potential revenue $\vec{\Lambda}$ of the future instance of the flight; the potential revenue $\vec{\Lambda}$ is calculated using both a nesting policy (irrespective of an order of the requests) and an out of nesting policy; the nesting policy (best case) and the out of nesting policy (worst case) are combined according to the aggressiveness parameter.

Particularly, a portion of the target function for the nesting policy is built at block 364. We define a potential nesting constrained weight $\overrightarrow{TNp_{ij}}$ and a potential nesting constrained volume $\overrightarrow{TNv_{ij}}$ that would have been transported for each i-th category by the j-th previous instance of the flight complying with the corresponding nesting authorisations $Ap_i$ and $Av_i$, respectively:

$$\sum_{\leq i} \overrightarrow{TNp_{ij}} \leq Ap_i$$

$$\sum_{\leq i} \overrightarrow{TNv_{ij}} \leq Av_i$$

The variables $\overrightarrow{TNp_{ij}}, \overrightarrow{TNv_{ij}}$ are subjected to the constraint $$\overrightarrow{TNp_{ij}} = \frac{\overrightarrow{TNv_{ij}}}{\overrightarrow{\delta_{ij0}}}$$

and to the simple bounds $\overrightarrow{TNp_{ij}} \leq P_{off}, \overrightarrow{TNv_{ij}} \leq V_{off}$.

A potential nesting revenue $\overrightarrow{TN\Lambda_j}$ of the j-th previous instance of the flight that would have been produced by the potential nesting constrained weight $\overrightarrow{TNp_{ij}}$ and the potential nesting constrained volume $\overrightarrow{TNv_{ij}}$ is given by:

$$\overrightarrow{TN\Lambda_j} = \sum_{i=1}^{5} \overrightarrow{TNp_{ij}} \cdot \vec{\lambda p_i}$$

The method then builds a further portion of the target function for the out of nesting policy, using two independent components for the weight and for the volume. Particularly, a set of out of nesting weight authorisations $AOp_i$ and a set of out of nesting volume authorisations $AOv_i$ are defined at block 366. If we denote with Pe the offered weight that is not used, and with Ve the offered volume that is not used, the out of nesting authorisations $AOp_i, AOv_i$ are defined by the following relations:

$$P = \sum_{i=1}^{5} AOp_i + Pe$$

$$V = \sum_{i=1}^{5} AOv_i + Ve$$

The out of nesting authorisations $AOp_i$ and $AOv_i$ are further constrained by the nesting authorisations $Ap_i$ and $Av_i$, respectively:

$$\sum_{i=1}^{5} Ap_i = \sum_{\leq i} AOp_i + Pe$$

$$\sum_{i=1}^{5} Av_i = \sum_{\leq i} AOv_i + Ve$$

We now define a potential out of nesting constrained weight $\overrightarrow{TOp_{ij}}$ that would have been transported for each i-th category by the j-th previous instance of the flight in the worst case complying with the out of nesting authorisations $AOp_i$, $AOv_i$ only for the weight, that is:

$$\overrightarrow{TOp_{ij}} \leq AOp_i$$

$$\overrightarrow{TOp_{ij}} \leq AOv_i \cdot \overrightarrow{\lambda_{ij0}}$$

Even in this case, the potential out of nesting constrained weight $\overrightarrow{TOp_{ij}}$ is subjected to the simple bounds $\overrightarrow{TOp_{ij}} \leq P_{off}$. A potential out of nesting weight revenue $\overrightarrow{TO\Lambda p_j}$ of the j-th previous instance of the flight that would have been produced by the potential out of nesting constrained weight $\overrightarrow{TOp_{ij}}$ is given by:

$$\overrightarrow{TO\Lambda p_j} = \sum_{i=1}^{5} \overrightarrow{TOp_{ij}} \cdot \vec{\lambda p_i}$$

Proceeding to block 368, we now define a potential out of nesting constrained volume $\overrightarrow{TOv_{ij}}$ that would have been transported for each i-th category by the j-th previous instance of the flight in the worst case complying with the out of nesting authorisations $AOp_i, AOv_i$ only for the volume, that is:

$$\overrightarrow{TOv_{ij}} \leq AOv_i$$

$$\overrightarrow{TOv_{ij}} \leq \frac{AOp_i}{\lambda_{ij0}}$$

As above, the potential out of nesting constrained volume $\overrightarrow{TOv_{ij}}$ is subjected to the simple bounds $\overrightarrow{TOv_{ij}} \leq V_{tot}$. A potential out of nesting volume revenue $\overrightarrow{TO\Lambda v_j}$ of the j-th previous instance of the flight that would have been produced by the potential out of nesting constrained volume $\overrightarrow{TOv_{ij}}$ is given by:

$$\overrightarrow{TO\Lambda v_j} = \sum_{i=1}^{5} \overrightarrow{TOv_{ij}} \cdot \vec{\lambda p_i} \cdot \overrightarrow{\delta_{ij0}}$$

The method then passes to block 370, wherein the target function to be optimised is defined combining the nesting portion and the weight and volume component of the out of nesting portion with the respective probabilities, according to the aggressiveness parameter AG:

$$\vec{\Lambda} = AG \cdot \sum_s (\overrightarrow{TN\Lambda_s} \cdot \vec{w_s}) +$$
$$\left(1 - \frac{AG}{2}\right) \cdot \sum_s (\overrightarrow{TO\Lambda p_s} \cdot \vec{w_s}) + \left(1 - \frac{AG}{2}\right) \cdot \sum_s (\overrightarrow{TO\Lambda v_s} \cdot \vec{w_s})$$

The nesting authorisations $Ap_i, Av_i$ that maximise the target function defined above (with the variables meeting the respecting constrains and single bounds) are then obtained at block 372.

Several by-products of this process may also be obtained. For example, the stochastic model calculates the minimum selling price $M\lambda p, M\lambda v$; particularly, the value $M\lambda p$ is equal to a marginal weight revenue and the value $M\lambda v$ is equal to a marginal volume revenue in the neighbourhoods of the optimal solution, which are obtained as the partial derivative of the target function with respect to the offered weight and offered volume, respectively. Moreover, the stochastic model calculates a mean potential constrained weight $\overrightarrow{CRp_{ij}}$ and a mean potential constrained volume $\overrightarrow{CRv_{ij}}$ as:

$$\overrightarrow{CRp_{ij}} = AG \cdot \sum_s (\overrightarrow{TNp_s} \cdot \vec{w_s}) + (1 - AG) \cdot \sum_s (\overrightarrow{TOp_s} \cdot \vec{w_s})$$
$$\overrightarrow{CRv_{ij}} = AG \cdot \sum_s (\overrightarrow{TNv_s} \cdot \vec{w_s}) + (1 - AG) \cdot \sum_s (\overrightarrow{TOv_s} \cdot \vec{w_s})$$

The method verifies at block 374 whether a last flight to be optimised has been processed. If not, the method returns to block 308 for applying the operations described above to a next flight. Conversely, the method returns to block 304 waiting for a new command.

Similar considerations apply if the program application performs an equivalent method, for example with error routines, escape functions for stopping execution of the program, several concurrent processes that execute the above described operations in parallel, and the like. Alternatively, a resolution of the freights or a unit load device used for transporting the freights are considered (for example by reducing the residual capacity of a pre-set coefficient), no-show freights and/or denied boarding (off-loaded) freights are estimated, an overbooking is taken into account (for example increasing the offered capacity by a pre-set coefficient), or no by-product is calculated.

More generally, the present invention provides a yield management method, which is used to optimise a yield parameter resulting from assigning a capacity offered by a future instance of a service to each one of a plurality of different categories of requests competing for the capacity; the capacity is defined by one or more capacity variables. A set of historical profiles is stored for each one of a plurality of previous instances of the service; the set includes a historical profile of an historical value of each capacity variable reserved by each category. A probability is then assigned to each previous instance of the service. The method estimates a potential profile of a potential value of the capacity variable from each historical profile; the estimation is carried out according to a corresponding current value of the capacity variable reserved by the category for the future instance of the service and according to a corresponding unconstrained demand of the capacity variable for the category in the previous instance of the service. A historical scenario is defined for each previous instance of the service; the historical scenario includes a final potential capacity variable from each corresponding potential profile. The method then determines an authorisation to allocate the offered capacity for each capacity variable of each category in the future instance of the service by applying a stochastic model to the historical scenarios according to the corresponding probabilities.

The computational complexity of the method according to the invention increases linearly with the number of the historical scenarios and it is independent of the number of categories; this is particularly advantageous in a commercial application wherein the market dynamic is very fast, so that a relatively low number of historical scenarios is often enough to take planning decisions. As a consequence, the problem defined by the yield management method can be solved in a reasonable amount of time. This allows the nesting authorisations to be recalculated several times during the opening period, and particularly with a higher frequency close to the departure of the future instance of the flight.

The solution of the invention does not require any simplification, shortcut or assumption to be made. Particularly, all the capacity variables are taken into account simultaneously, the scenarios are not artificially reduced in any way, and no assumption is made on the (simple and joint) statistical distribution of the variables involved in the problem.

The envisaged solution derives the probabilistic nature of the demand directly from the reality. As a consequence, any kind of demand (even if particularly scattered or inconsistent) yields to consistent and conservative suggestions. Therefore, the method of the invention is accurate, robust and secure.

The preferred embodiment of the invention described above offers further advantages. For example, the probability assigned to each historical scenario is calculated by normalising the corresponding weight, which is a combination of the season coefficient and the time distance coefficient. In this way, the previous instances of the flight that have happened in a similar period as their future instance and/or that are close to the current time are given more importance.

Preferably, this value is calculated as a weighted sum of the season coefficient and the time distance coefficient. This approach gives more relevance to the dominant coefficient, and yields to a good result even if the number of previous instances of the flight is not very high.

Similar considerations apply if a different number of periods is taken into considerations (such as the days of the week), if the season coefficient and/or the time distance coefficient are calculated in a different manner, if different values are used in the formula defining the time distance coefficient and/or the weight, if the time distance coefficient depends on a release of the previous instance of the flight (or more generally on an occurrence thereof), and so on. Alternatively, each weight is assigned to a set consisting of more than one previous instance of the flight (such as including all the previous instances of the flight in a corresponding month), the weight further depends on mobile events (such as Easter), the weight is calculated as the product of the season coefficient and the time distance coefficient (giving a high weight only when both the coefficients are high).

The potential profiles are estimated by emphasising the demand when the respective category has been closed to sales; the emphasis values are defined in order to take into account both the weight and the volume in a symmetric manner. The suggested procedure emphasises the demand according to what has happened in the other previous instances of the flight in which the category was (almost) always open.

Moreover, the result of the integration is corrected to ensure that no negative forecasts for the potential requests at the departure of the future instance of the flight are obtained when the demand is low.

Similar considerations apply if each profile consists of a different number of snapshots, if the snapshots are taken with a different frequency, if the potential profiles are built with a different procedure, if the opening coefficients and/or the emphasis values are calculated in another manner, if a different interpolation technique for obtaining the potential gradients is employed, if the potential gradients are integrated in a different manner, if a dummy snapshot preceding the opening of the flight is introduced for processing flights that have not been opened yet, and the like.

Alternatively, the emphasis values are calculated taking into account only the previous instances of the flight in which the category was always open (assuming a sufficient number of corresponding historical profiles), using only the historical profiles with a growing demand, or performing a weighted mean of the more optimistic increments of the demand in the historical profiles. However, the method according to the present invention leads itself to be carried out without any correction to the result of the integration, or even detecting and storing any denied request, so as to know the potential profiles directly (even if some adjustment is always suggested because it is very difficult to known all the denied requests for sure).

The potential profiles are further reconciled to an admissible reference density; in this way, it is assured that no inconsistent forecasts are produced.

The reference density is set to the closest one between the density of the previous snapshot in the potential profile and the density of the current snapshot in the historical profile. This value makes it possible to take into account what has happened in the historical profile without excessively affecting the potential profile.

Similar considerations apply if another logic relation between the capacity variables is considered for the reconciliation of the potential profiles, if the reconciliation is carried out in a different manner, if a different reference density is employed, and so on. For example, in an alternative embodiment of the present invention the reference density is set to a mean of the above-mentioned limit values, to the density of the preceding snapshot in the historical profile, or to a pre-set value. However, the method of the invention leads itself to be carried out even without performing any reconciliation of the potential profiles.

Each historical scenario further includes the potential revenue, which is estimated from the corresponding historical revenue; when the value is unknown, the historical revenue is set to a weighted mean of the values known in the other previous instances of the flight. This is particularly advantageous when it is difficult, if not impossible, to detect the real revenue of each shipment in the previous instance of the flight at its departure; moreover, the employed procedure is independent of the hypothesis that the freights of each shipment maintain the same category from the historical profile to the potential profile.

Preferably, the potential unit revenue is calculated as a mean of the historical unit revenue and the current unit revenue, weighted according to the corrective factor. In this way, the potential unit revenue takes into account what is currently happening for the future instance of the flight; however, the current unit revenue affects the potential unit revenue only when the corrective factor is high (this is preferable when the current revenue is not particularly accurate).

The corrective factor is a combination of the departure coefficient and the increment coefficient. In this way, the potential revenue takes into account what is actually happening only when this can affect the forecast.

The corrective factor is calculated as a weighted sum of the departure coefficient and the increment coefficient. This approach gives more relevance to the dominant coefficient, and yields to a good result even if the current revenue is not very accurate.

Similar considerations apply if the potential revenue is estimated in a different manner, if the value of each accepted request is set to a mean market value (when its value cannot be determined in an accurate manner by the reservation subsystem), if another formula is employed for combining the potential unit revenue and the current unit revenue, if the departure coefficient and/or the increment coefficient are calculated in a different manner, if different values are used in the formula defining the departure coefficient and/or the corrective factor, and so on. Alternatively, the corrective factor depends on other coefficients, the corrective factor is calculated as the product of the departure coefficient and the increment coefficient (giving a high value only when both the coefficients are high); however, the solution of the invention leads itself to be implemented without taking the current revenue into consideration, or even without estimating any potential revenue.

Two nesting orders (for the weight and the volume) are calculated according to the mean potential revenue of each category.

Moreover, corresponding input nesting orders are also provided; the nesting orders are obtained updating the input nesting orders according to the mean potential revenue for the categories in which this value is available.

Similar considerations apply if another technique is employed for calculating the nesting orders, or if the input nesting order are updated in a different manner. Alternatively, no input nesting orders are provided, or the nesting orders are not calculated by the system (but they are always set by the space controller).

The nesting portion and the out of nesting portion of the target function, which are combined using the aggressiveness parameter, allow the result of the optimisation to be tuned according to different attitudes to the risk; particularly, a more aggressive behaviour gives a higher revenue in the worst case (wherein the requests for the most valuable freights are the last ones), and a lower revenue in the best case (wherein the requests for the most valuable freights are the first ones).

Advantageously, the out of nesting portion of the target function is calculated with two independent components for the weight and for the volume. In this way, the constraints for the worst case are slightly relaxed with respect to a real out of nesting policy, wherein the out of nesting authorisations must be met by both the weight and the volume. Conversely, in the proposed formula the two capacity variables are considered one at the time, so that each request may be accepted even if it meets the out of nesting authorisations only for the weight and not for the volume (or vice-versa).

Similar considerations apply if the stochastic model is defined in a different manner, if another target function is envisaged, if the different components of the out of nesting portion and/or the two portions of the target function are combined in another way, and the like. However, the solution of the invention leads itself to be carried out even with the out of nesting portion that is calculated simultaneously for the weight and the volume, or with the target function that is defined with a single policy (either in nesting or out of nesting).

Preferably, the space controller inputs a user scenario with the respective probability; in this way, any personal feeling of the future may be introduced into the stochastic model in a very simple manner. However, the solution according to the present invention leads itself to be implemented even without the possibility of imputing any further scenario.

The proposed solution is particularly advantageous in a cargo flight, wherein the capacity is defined by two independent variables (weight and volume), and the revenue of the old instances of the flight is not immediately available. Alternatively, the solution of the invention is used to optimise another yield parameter resulting from assigning an offered capacity defined by one or more different variables; moreover, other applications of the yield management method are contemplated, for example in a passenger flight, in a different transportation system (such as a train), in a system for controlling booking of rooms in a hotel, and the like.

Advantageously, the solution according to the present invention is implemented with a program application, which consists of a computer program (software) provided on CD-ROM.

Alternatively, the program application is provided on floppy-disk, is pre-loaded onto the hard-disk, or is stored on any other computer readable medium, is sent to the authorisation subsystem through the INTERNET, is broadcast, or more generally is provided in any other form directly loadable into the working memory of the authorisation subsystem. However, the method according to the present invention leads itself to be carried out even with a hardware structure, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

What is claimed is:

1. A computer system for managing air cargo yield for optimising a yield parameter resulting from assigning an offered capacity offered by a future instance of a cargo flight to each one of a plurality of different categories of requests competing for the capacity, the computer system comprising:
    a memory; and
    a processor in communication with the memory, wherein the computer system is configured to perform a method, the method comprising:
        separately defining the offered capacity by a weight capacity variable and by a volume capacity variable, the weight variable and the volume variable independent relative to each other;
        storing a set of historical profiles for each one of a plurality of previous instances of the cargo flight, the set including a historical profile of a historical value of the weight variable and the volume variable reserved by each category,
        assigning a probability to each previous instance of the cargo flight,
        estimating a potential profile of a potential value of the weight variable and the volume variable from each historical profile according to a corresponding current value of the capacity variable reserved by the category for the future instance of the cargo flight and according to a corresponding unconstrained demand of the weight variable and the volume variable for the category in the previous instance of the cargo flight,
        defining a historical scenario for each previous instance of the cargo flight, the historical scenario including a final potential capacity variable from each corresponding potential profile, the final potential variable comprising a final potential weight capacity variable and a final potential volume capacity variable;
        determining an authorisation to allocate the offered capacity for the weight variable and the volume variable of each category in the future instance of the cargo flight by applying a stochastic model to the historical scenarios according to the corresponding probabilities;
        providing a determination to a display of a computing unit of an acceptance or a rejection of a request for the cargo flight based on the authorization; and
        wherein each historical profile and each potential profile include a plurality of corresponding snapshots of the reserved capacity variable and of the potential capacity variable, respectively, the estimating the potential profile comprising:
            estimating an opening coefficient for each period comprised between two consecutive snapshots, the opening coefficient being indicative of a percentage of time during which the category was open in the period,
            calculating an emphasis value for each period as a weighted mean of a gradient in the period of the reserved capacity variable for the category in a subset of the corresponding historical profiles,
            estimating a potential gradient for each period as a linear interpolation between the gradient, and
            constructing the potential profile from a time corresponding to the current time by integrating the potential gradients starting from the corresponding current capacity variable.

2. The computer system of claim 1, wherein the estimating the potential profile further comprises:
    verifying whether at least one result of the integration in each snapshot for each category is not strictly positive, and
    setting each potential capacity variable of the category in the snapshot to zero if the verification is affirmative.

3. The computer system of claim 1, wherein the estimating the potential profile further comprises reconciling the potential capacity variables for each category in the snapshot to a reference value of a logic relation there between.

4. The computer system of claim 3, wherein the reconciling comprises:
    verifying whether the logic relation between the potential capacity variables for the category in the snapshot is included between a first limit defined by the logic relation between the reserved capacity variables for the category in the snapshot and a second limit defined by the logic relation between the potential capacity variables for the category in a preceding snapshot, and
    updating the potential capacity variables for the category in the snapshot for correcting the corresponding logic relation to the closest one of the first limit and the second limit.

5. The computer system of claim 1, wherein the assigning the probability comprises:
    determining a first coefficient depending on a difference between a temporal period associated with the previous instance of the cargo flight and a temporal period associated with the future instance of the cargo flight, determining a second coefficient depending on a space between a current time and an occurrence time of the previous instance of the cargo flight, calculating a weight by combining the first coefficient and the second coefficient, calculating the probability by normalising the weight.

6. The computer system of claim 5, wherein the calculating the weight consists of calculating a weighted sum of the first coefficient and the second coefficient.

7. The computer system of claim 1, wherein the method further comprises:

determining a historical unit value of the yield parameter for each category in each previous instance of the cargo flight if available, estimating the historical unit yield parameter for each category in the other previous instances of the cargo flight as a weighted mean of the corresponding historical unit yield parameters available, estimating a potential unit value of the yield parameter for each category in each previous instance of the cargo flight from the corresponding historical unit yield parameter, and calculating a potential value of the yield parameter for each category in each previous instance of the cargo flight multiplying the corresponding potential unit yield parameter by the corresponding potential capacity variable, the potential yield parameter being included in the corresponding historical scenario.

8. The computer system of claim 7, wherein the estimating each potential unit yield parameter comprises:

determining a current unit value of the yield parameter for the corresponding category in the future instance of the cargo flight, and calculating each potential unit yield parameter as a sum of the corresponding historical unit yield parameter and current unit yield parameter weighted according to a corrective factor.

9. The computer system of claim 8, wherein the calculating the potential unit yield parameter further comprises:

determining a further first coefficient depending on a difference between the current time and a planned occurrence time of the future instance of the cargo flight, determining a further second coefficient depending on an increment of the at least one potential capacity variable with respect to the at least one current capacity variable for the category, calculating the corrective factor by combining the further first coefficient and the further second coefficient, and calculating the potential yield parameter as a sum of the historical yield parameter and the current yield parameter weighted according to the corrective factor.

10. The computer system of claim 8, wherein the method further comprises:

calculating a weighted mean value of the potential yield parameter for each capacity variable of each category, determining a nesting order of the categories for each capacity variable according to the corresponding weighted mean potential yield parameters.

11. The computer system of claim 10, wherein the determining each nesting order comprises:

providing an input nesting order of the categories for each capacity variable, and updating each input nesting order by ranking the categories having at lest one scenario with each component thereof that is strictly positive.

12. The computer system of claim 1, wherein the determining the authorisations comprises:

providing an aggressiveness parameter indicative of an attitude to the risk, defining a first portion of a target function, the first portion calculating the yield parameter by assigning the offered capacity with a nesting policy, defining a second portion of the target function, the second portion calculating the yield parameter by assigning the offered capacity with an out of nesting policy, defining the target function as a sum of the first portion and the second portion weighted according to the aggressiveness parameter, and calculating the authorisations by optimising the target function.

13. The computer system of claim 12, wherein the defining the second portion comprises defining an independent component of the second portion for each capacity variable.

14. The computer system of claim 1, wherein the method further comprises providing a user-defined scenario with a corresponding probability, the stochastic model being further applied to the user-defined scenario according to the corresponding probability.

15. The computer system of claim 1, wherein the plurality of capacity variables consists of a weight and a volume, and the yield parameter consists of a revenue.

16. The computer system of claim 1, wherein
the determining the authorization comprises employing a partial nesting policy with two sets of independent authorizations relating to the weight variable and the volume variable.

17. The computer system of claim 16, wherein the method further comprises allocating the offered capacity by comparing the request simultaneously to the offered capacity for the weight variable and the volume variable.

18. The computer system of claim 16, wherein the allocating comprises allocating the offered capacity relative to the categories by two sets of independent allocations, each of said allocations using a partial nesting policy.

* * * * *